(12) United States Patent
Beaurepaire et al.

(10) Patent No.: US 11,537,953 B2
(45) Date of Patent: Dec. 27, 2022

(54) METHOD AND APPARATUS FOR PROACTIVE BOOKING OF A SHARED VEHICLE

(71) Applicant: HERE GLOBAL B.V., Eindhoven (NL)

(72) Inventors: Jerome Beaurepaire, Berlin (DE); Jens Unger, Berlin (DE); Sven Krome, Berlin (DE); Andreas Graf, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 189 days.

(21) Appl. No.: 16/204,837

(22) Filed: Nov. 29, 2018

(65) Prior Publication Data
US 2020/0175429 A1 Jun. 4, 2020

(51) Int. Cl.
*G06Q 10/02* (2012.01)
*G06N 7/00* (2006.01)
*G01C 21/34* (2006.01)

(52) U.S. Cl.
CPC .............. *G06Q 10/02* (2013.01); *G06N 7/005* (2013.01); *G01C 21/3423* (2013.01); *G01C 21/3453* (2013.01)

(58) Field of Classification Search
CPC .... G06Q 10/02; G06Q 30/0645; G06Q 50/30; G01C 21/3423; G01C 21/3453; G08G 1/202; G06N 7/005
USPC .......................................................... 705/5
See application file for complete search history.

(56) References Cited

U.S. PATENT DOCUMENTS

| 9,479,931 | B2 | 10/2016 | Ortiz, Jr. et al. |
| 9,499,128 | B2 | 11/2016 | Reh et al. |
| 9,684,911 | B2 | 6/2017 | Audet |
| 2002/0186144 | A1 | 12/2002 | Meunier |

(Continued)

FOREIGN PATENT DOCUMENTS

| CN | 101799978 A | 8/2010 |
| CN | 105513414 A | 4/2016 |

(Continued)

OTHER PUBLICATIONS

Buehler, Ralph. Determinants of transport mode choice: a comparison of Germany and the USA, Journal of Transport Geography https://www.sciencedirect.com/science/article/pii/S0966692310001171 (Year: 2011).*

(Continued)

*Primary Examiner* — Shannon S Campbell
*Assistant Examiner* — Lisa Ma
(74) *Attorney, Agent, or Firm* — Ditthavong, Steiner & Mlotkowski

(57) ABSTRACT

An approach is provided for proactive booking of a shared vehicle. A routing platform determines that a user is leaving a location for a destination. The routing platform calculates a probability that the user will use a transport mode employing the shared vehicle for a route segment to the destination based on a context and a profile of the user. The routing platform initiates a creation of a proactive reservation of the shared vehicle based on determining that the probability meets or exceeds a threshold value. The proactive reservation is created without intervention of the user.

17 Claims, 12 Drawing Sheets

(56) References Cited

U.S. PATENT DOCUMENTS

| | | |
|---|---|---|
| 2003/0023463 A1 | 1/2003 | Dombroski et al. |
| 2004/0073440 A1 | 4/2004 | Garbers et al. |
| 2009/0216704 A1* | 8/2009 | Zheng ................ G01C 21/3423 707/999.1 |
| 2010/0280853 A1 | 11/2010 | Petralia et al. |
| 2012/0203582 A1* | 8/2012 | Smith .................... G06Q 10/02 705/5 |
| 2013/0132140 A1* | 5/2013 | Amin .................... G06Q 10/063 705/7.13 |
| 2013/0325521 A1 | 12/2013 | Jameel et al. |
| 2014/0149156 A1 | 5/2014 | Schroeder |
| 2014/0365250 A1* | 12/2014 | Ikeda .................... G06Q 10/02 705/5 |
| 2015/0278716 A1 | 10/2015 | Sakata |
| 2016/0209220 A1* | 7/2016 | Laetz .................... G08G 1/202 |
| 2017/0147951 A1* | 5/2017 | Meyer .................... G06Q 50/14 |
| 2017/0357914 A1 | 12/2017 | Tulabandhula et al. |
| 2018/0101894 A1* | 4/2018 | Markoff ............ G06Q 30/0639 |
| 2018/0102017 A1* | 4/2018 | Brinig ................ G05D 1/0088 |
| 2018/0181910 A1* | 6/2018 | Zhang ................ G06Q 10/0838 |
| 2018/0204300 A1* | 7/2018 | Marco ................ G01C 21/3438 |
| 2019/0378055 A1* | 12/2019 | Whitt ...................... B60L 58/13 |
| 2020/0065722 A1* | 2/2020 | Smith .................... G06Q 10/02 |
| 2021/0082075 A1* | 3/2021 | Spielman ............... G06Q 50/30 |
| 2021/0182751 A1* | 6/2021 | Pan ........................ G06T 11/00 |

FOREIGN PATENT DOCUMENTS

| | | | |
|---|---|---|---|
| CN | 106878421 A | 6/2017 | |
| CN | 106909979 A | 6/2017 | |
| JP | 2010044471 A | 2/2010 | |
| WO | 2016128295 A1 | 8/2016 | |
| WO | WO-2019154398 A1 * | 8/2019 | ......... G01C 21/3423 |
| WO | WO-2019182559 A1 * | 9/2019 | ............ G06Q 50/30 |

OTHER PUBLICATIONS

Office Action for related European Patent Application No. 19211740.6-1222, dated Apr. 2, 2020, 43 pages.

Office Action for Related European Application No. 19211740.6-1222, dated Mar. 31, 2021, 9 pages.

* cited by examiner

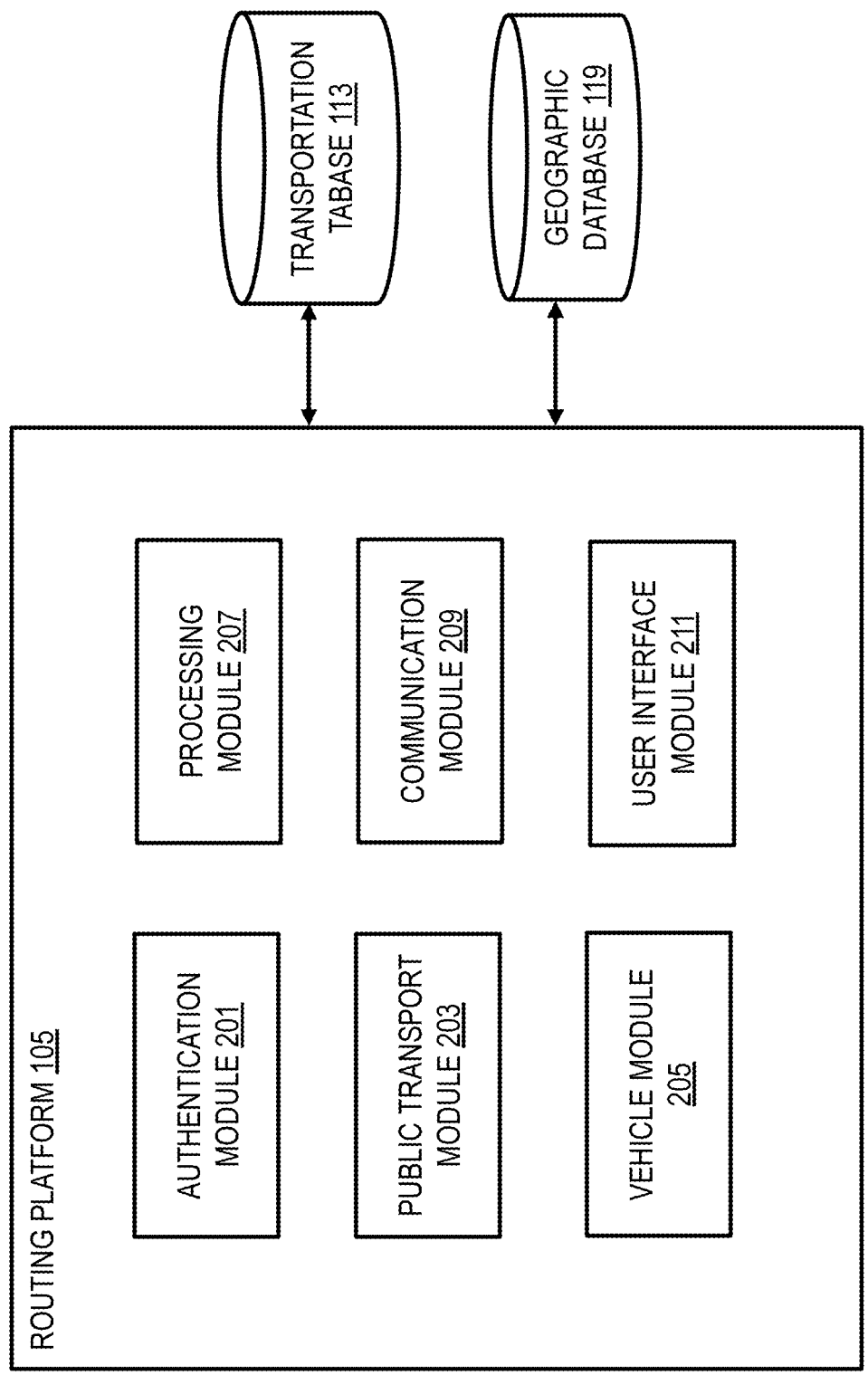

METHOD AND APPARATUS FOR PROACTIVE BOOKING OF A SHARED VEHICLE

BACKGROUND

Service providers and automobile manufacturers are continually challenged to deliver value and convenience to consumers by, for example, providing compelling transportation and navigation services. One area of interest has been the development of intermodal transport routing that combines multiple transport modes (e.g., taxi, bus, train, bicycle, etc.) to reach a destination with a least amount of time. As shared vehicles (e.g., a car, a motorcycle, an electric bike, an electric scooter, a bicycle, etc.) become popular, some navigation mapping services include carsharing as one transport mode option among more traditional forms of transport (e.g., public transportation systems with fixed stations or hubs). However, these different forms of transportation have been presented as separate and distinct options. Moreover, because vehicle sharing services often require user action or pre-planning, users often miss opportunities to use these services in intermodal routes even when they can potentially decrease travel time. Accordingly, service provides face significant technical challenges to integrate vehicle sharing services into intermodal routes in a way that is intuitive and convenient for users.

SOME EXAMPLE EMBODIMENTS

Therefore, there is a need for an approach for proactive booking of a shared vehicle, e.g., to improve intermodal routes.

According to one embodiment, a method comprises determining that a user is leaving a location for a destination. The method also comprises calculating a probability that the user will use a transport mode employing the shared vehicle for a route segment to the destination based on a context and a profile of the user. The method further comprises initiating a creation of a proactive reservation of the shared vehicle based on determining that the probability meets or exceeds a threshold value, wherein the proactive reservation is created without intervention of the user.

According to another embodiment, an apparatus comprises at least one processor, and at least one memory including computer program code for one or more computer programs, the at least one memory and the computer program code configured to, with the at least one processor, determine that a user is leaving a location for a destination. The apparatus is also caused to calculate a probability that the user will use a transport mode employing the shared vehicle for a route segment to the destination based on a context and a profile of the user. The apparatus is further caused to initiate a creation of a proactive reservation of the shared vehicle based on determining that the probability meets or exceeds a threshold value, wherein the proactive reservation is created without intervention of the user.

According to another embodiment, a computer-readable storage medium carries one or more sequences of one or more instructions which, when executed by one or more processors, cause, at least in part, an apparatus to determine that a user is leaving a location for a destination. The apparatus is also caused to calculate a probability that the user will use a transport mode employing the shared vehicle for a route segment to the destination based on a context and a profile of the user. The apparatus is further caused to initiate a creation of a proactive reservation of the shared vehicle based on determining that the probability meets or exceeds a threshold value, wherein the proactive reservation is created without intervention of the user.

According to another embodiment, an apparatus comprises means for determining that a user is leaving a location for a destination. The apparatus also comprises means for calculating a probability that the user will use a transport mode employing the shared vehicle for a route segment to the destination based on a context and a profile of the user. The apparatus further comprises means for initiating a creation of a proactive reservation of the shared vehicle based on determining that the probability meets or exceeds a threshold value, wherein the proactive reservation is created without intervention of the user.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of the components of a routing platform, according to one embodiment;

DESCRIPTION OF SOME EMBODIMENTS

Examples of a method, apparatus, and computer program for proactive booking of a shared vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
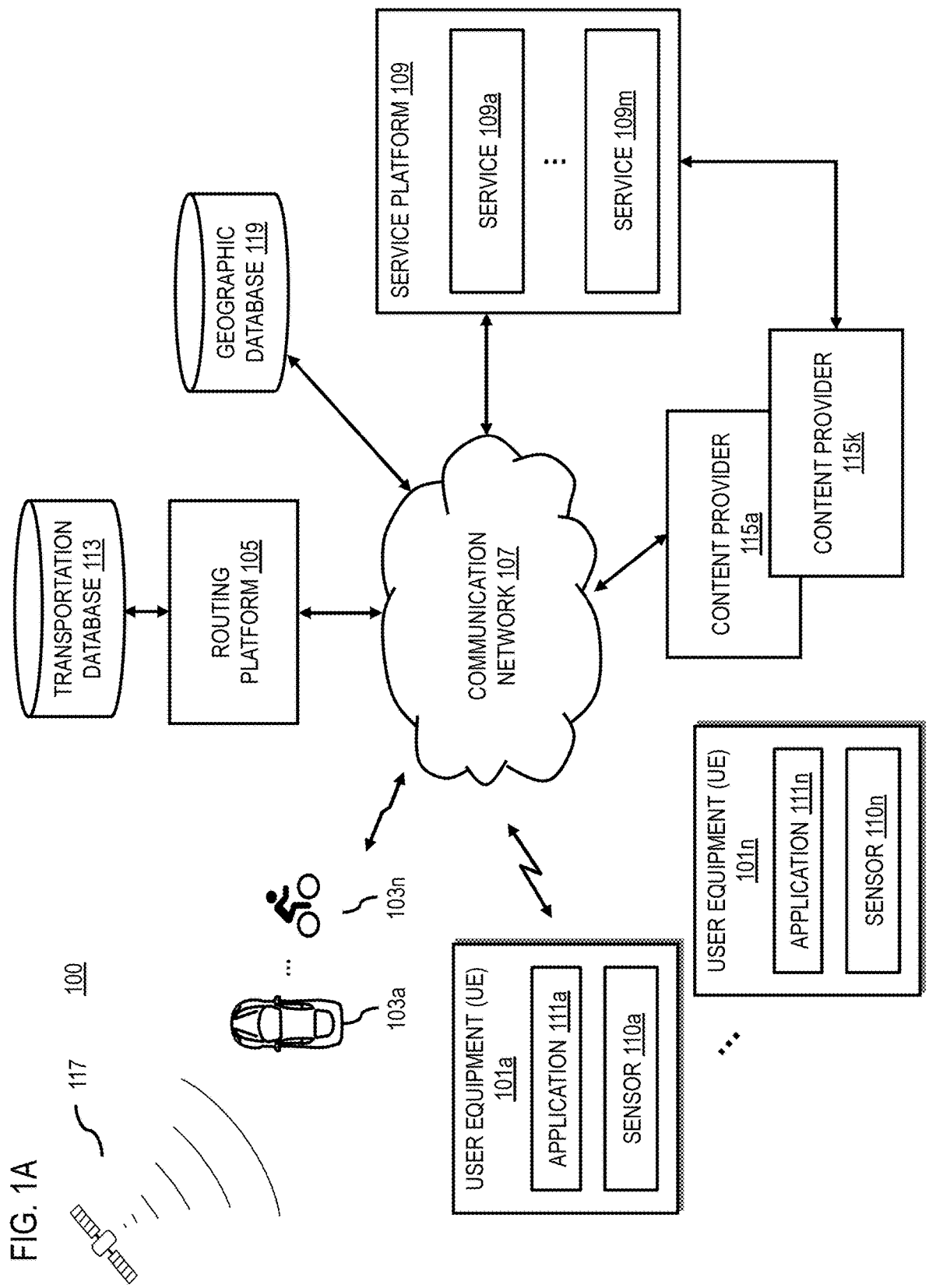
FIG. 1A is a diagram of a system for proactive booking of a shared vehicle, according to one embodiment.

FIG. 1A is a diagram of a system for proactive booking of a shared vehicle, according to one embodiment. As transportation options or modes of transport (e.g., personal vehicles, shared vehicles, autonomous vehicles, public transport, etc.) increase, the task of generating a route to guide a user to a destination is also increasing in complexity. With the emergence of shared vehicle services (e.g., shared cars, bicycles, scooters, etc.), the options for generating intermodal routes have also increased. By way of example, shared vehicle services generally offer a fleet of vehicles that can be "booked" or reserved for use by end users. Hence, intermodal solutions that add a shared vehicle segment to an intermodal route can a provide valuable service to consumers by providing additional options to enable a user to complete a trip more efficiently while frustrations associated with other forms of transport (e.g., by skipping the waiting time for a bus or train and allowing a non-interrupted and less frustrating journey). Then systems and service became available to guide users over multiple means of transport using intermodal or multimodal routes. As used herein, an intermodal/multimodal route is a route that uses different means of transport on different legs or segments of the route to complete a trip from origin to destination. For example, on the way walking towards a subway station, the user is presented with many shared vehicles in vicinity to ride to the subway station.

However, traditional shared vehicle services generally rely on a user to reserve or book shared vehicles onsite or in advance (e.g., to ensure availability and provide for more efficient fleet management), it is difficult for the user to make optimal booking considering all booking related constraints (e.g., user subscriptions, booking periods, usage costs, reservation expiration times, pick-up locations, vehicle availability, etc.) on the go. Therefore, there is a need to properly manage the booking or reservation of a shared vehicle used as part of an intermodal route without burdening the user.

However, providing of proactive making and/or changing a reservation of a shared vehicle located in vicinity of a user location or en route to a user destination can be technically challenging, considering various types of shared vehicles (e.g., a car, a motorcycle, an electric bike, an electric scooter, a bicycle, a boat, etc.) managed by different operators, relevant reservation criteria (e.g., a reservation time length, a number of concurrent reservation limit, etc.), promotions (e.g., the first 30 minutes free for a new user, a bonus if returning to the pickup location or preferred locations, etc.), dropping off criteria (e.g., distance, location, area limitations), the route to the final destination of the user, etc.

To address this problem, a system 100 of FIG. 1A introduces a capability to efficiently create the next generation of intermodal routing services by providing for proactive booking or reservation of vehicles used in intermodal routes. In one embodiment, the system 100 can proactively make a vehicle reservation before routing the user to the vehicle or before the user reaching the vehicle (as opposed, e.g., to manually making the vehicle reservation in traditional methods) based on monitoring the user's progress in a segment or leg of the intermodal route to an intermediate destination (e.g., catching a subway train) or a final destination. The system 100 can then use the monitored progress to determine or predict how likely the user will use a shared vehicle to reach the intermediate destination or the final destination and reserve the shared vehicle given any booking constraints (e.g., user subscriptions, booking periods, usage costs, reservation expiration times, pick-up locations, vehicle availability, etc.).

In one embodiment, the system 100 can use a routing cost function, dynamic (or real time) traffic monitoring and timing adjustments to identify an optimal reservation for a shared vehicle (e.g., if determined to be needed), to use the shared vehicle to reach an intermediate destination, and ultimately to the final destination, before the user reaching the shared vehicle. Optimal, for instance, refers to a vehicle reservation that enables the user to pick up a vehicle to reach an intermediate destination or a final destination with a time, distance, etc. that meets threshold requirements or is a minimum among calculated candidate routes, vehicles, and/ or locations. As indicated, the route can be an intermodal/multimodal route that combines the use of multiple different modes of transport.

For example, an intermodal/multimodal route can direct a user to walk towards a shared vehicle location, then take a shared vehicle to an intermediate destination or a user destination. In one embodiment, the multimodal route comprises a first walking segment, a second shared vehicle segment, and segments between the intermediate destination and the final destination, and the system 100 determines alternate transport availability information (e.g., either the availability of alternate transport modes or the unavailability of alternate transport modes) based on static transport schedule data, and/or real-time transport tracking data, using intermodal and multimodal routing algorithms. By way of example, the alternate transport modes may include a public transit mode, a pedestrian mode, a bicycling mode, a shared vehicle, etc. The public transit mode may include microtransit solutions that work on an on-demand basis. A shared vehicle may be a car, a motorcycle, an electric bike, an electric scooter, a bicycle, a kickboard, a mini scooter, a boat, etc. owned by an individual, a commercial business, a public agency, a cooperative, or an ad hoc grouping.

To simplify the discussion, the multimodal route discussed below comprises the first walking segment and the second shared vehicle segment. In one embodiment, the system 100 determines that a user is leaving a location for the final destination (e.g., work). In one embodiment, the destination is determined from a next appointment queried from the user's calendar data. In other embodiments, the destination is determined from a social media event accepted or signed up by the user, an event in the user's message (e.g., email, text message, instant message, SMS message, MMS message, etc.), etc.

In one embodiment, the system 100 presents routes to the user, and the user can select a route based on the number of available vehicles. A route with several vehicle options (e.g., a number and/or types of available vehicles) could be more attractive to some users since there are more vehicle options to choose later. For example, at each intersection, the system 100 and/or the user can discover all the vehicle options available on each street by pointing at one direction. In case that the user needs to make a detour to complete a task based on a received message, call, etc., the route with more vehicle options offers more choices to complete the task.

In another embodiment, the system 100 and/or the user may also decide to prioritize a walk route over another one based on the vehicle options presented considering user context (e.g., riding capabilities, carried load, travelling with a family member, etc.), user profile, user preferences (e.g., preferences of the user and traveling companions), environmental context (e.g., weather, traffic, etc.), etc. In a case that the user carries bulky grocery and travels with one family member, a route with 2 bikes, 2 scooters, and 4 cars is preferred over a route with 8 bikes, because the cars can carry more loads and the family member has a broken foot. When there are multiple users, the system 100 will book enough number of vehicles (e.g., 2 bikes) or a vehicle with enough capacity (e.g., an e-scooter with 2 seats).

In one embodiment, the system 100 calculates a probability that the user will use a transport mode employing a shared vehicle for a route segment to an intermediate destination (e.g., a subway station) or the destination based on a context and/or a profile of the user, etc. The context can include weather, one or more people traveling with the user, a subsequent destination, a load carried by the user, or a combination thereof. The profile of the user can include user preferences regarding a number of transport modes, a vehicle type, model, cost, convenience, ease of use, or a combination thereof, vehicle usage history data regarding a number of transport modes, a vehicle type, model, cost, convenience, ease of use, or a combination thereof. For example, the system 100 calculates the probability for each near-by and/or en route vehicle, considering the user destination, the user's heading, the user's travel pattern history (e.g., the commonly taken routes, transport modes, etc.), the user's preferences (e.g., which transport mode is preferred under which context), the user's familiarity index with the area (e.g., a mobility graph), the user's calendar (e.g., where and when the user needs to be at a given time), etc.

In one embodiment, the system 100 initiates a creation of a proactive reservation of the shared vehicle based on determining that the probability meets or exceeds a threshold value (e.g., 60%). The proactive reservation is created without intervention of the user. The vehicle (e.g., cars, motorcycles, electric bikes, electric scooters, bicycles, boats, airplanes, etc.) can be human-operated, semi-autonomous, or autonomous. Although various embodiments are described with respect to a transfer from a no-reservation-required transport mode to a reservation-required transport mode, it is contemplated that the approach described herein may be used with other types of transfers, such as a transfer from a reservation-required transport mode to another reservation-required transport mode, and the system 100 can handle any numbers of such transfers towards the user destination. In one embodiment, the system 100 proactively reserves an autonomous vehicle for the user to pick up and then travel to the intermediate destination or the final destination of the user. In another embodiment, the system 100 proactively reserves a human-operated or semi-autonomous vehicle for the user to pick up. These embodiments are applicable to centralized ride-sharing, peer-to-peer ride-sharing, car-pooling, taxi cabs, food delivery, etc.

In one embodiment, the system 100 could inform autonomous vehicles in vicinity of a user regarding the likelihood that the user is interested in taking a ride, when the user walks towards a given direction. In another embodiment, an autonomous vehicle passing the user may decide to signify its presence to the user and/or the system 100 when the previously and/or currently computed probability is high.

In one embodiment, the system 100 determines a type of the shared vehicle to reserve in the proactive reservation based on the context and the profile of the user. For example, the system 100 detects a user travel pattern/habit using machine learning algorithms and predicts that the user prefers to use one model/type of shared vehicles. In another embodiment, the system 100 detects that the user prefers to use the model/type of shared vehicles based on an entry in the user's calendar (e.g., e-scooter), a social media event accepted or signed up by the user (e.g., a shared bicycle tour), an event in the user's message (e.g., email, text message, instant message, SMS message, MMS message, etc.).

In one embodiment, the system 100 includes one or more processes for automatically determining if and where a user may need a shared vehicle to travel to a destination, and an online service collecting routing information and providing guidance to the user to reach the destination faster and/or cheaper using proactive vehicle reservation made according to the embodiments described herein. In another embodiment, the system 100 detects a user travel pattern/habit and predicts the user's need for reserving a vehicle to reach a destination. In yet another embodiment, the system 100 detects the user's need for reserving a vehicle from an entry in the user's calendar, a social media event accepted or signed up by the user, an event in the user's message (e.g., email, text message, instant message, SMS message, MMS message, etc.).

In one embodiment, the system 100 makes a proactive reservation for a shared vehicle close by the user and en route to the subway station while the user is walking on the first segment; however, when detecting that the user reaches and skips the reserved vehicle, the system 100 makes another proactive reservation for another shared vehicle close by the user and en route to the subway station. For example, the system 100 initiates a cancellation of the proactive reservation based on determining that the user has passed a location of the shared vehicle by a threshold distance or that the user has taken a different route segment. In another embodiment, the system 100 shortens a proactive reservation (e.g., a standard 15-min reservation period) to, for example, a walking time to the reserved vehicle (e.g., 3 minutes) plus 2 minutes buffer time, to avoid overly booking the vehicle and reduce the reservation impact on the shared vehicle operator.

In another embodiment, the system 100 provides data for presenting the proactive reservation in a user interface, wherein the user interface further presents the user with an option to select or ignore the proactive reservation. For example, the system 100 initiates a cancellation of the proactive reservation based on determining that the user has selected on the user interface to ignore the proactive reservation.

In another embodiment, the system 100 presents the proactive reservation in a user interface of an augmented reality (AR) headset. For example, a reserved bike is highlighted in the AR user interface, and the system 100 cancels the reservation when detecting the user intentionally looks away from the reserved bike.

When the user selects the proactive reservation, the system 100 presents a notification of an availability of the shared vehicle for use by the user based on determining that the user is within a threshold vicinity of a location of the shared vehicle. For example, the system 100 presents the notification in a two-dimensional user interface, a three-dimensional user interface, an augmented reality user interface, or a combination thereof.

When the user selects to ignore the proactive reservation, the system 100 determines another shared vehicle that can be employed for the different route segment, and initiates a creation of another proactive reservation for the another shared vehicle based on the context and the profile of the user that has been updated for the different route.

In one embodiment, UEs 101 of a user and sensors in a vehicle 103 are collecting and reporting data (e.g., location data) to the system 100 to support the determining candidate shared vehicles, their pickup locations, and/or proactive vehicle reservations according to the embodiments described herein. In this way, for instance, vehicles 103a-103n and/or vehicle users can use the system for sharing trajectory data and receiving vehicle supply and demand information as well as contextual data (e.g., traffic, weather conditions, etc.) that can be used to dynamically update the candidate shared vehicles, their pickup locations, and/or proactive vehicle reservations to determine the route option (including one or more vehicle reservations and/or changes) that optimizes or reduces the amount of cost, time, distance, etc. to a destination.

In one embodiment, the system 100 automatically decides the vehicle option for the user based on a cost function including routing cost function parameter such as distance, fuel efficiency, etc. customized for the user. In other embodiments, the routing platform 105 automatically decides an optimum shared vehicle for the user based on the cost function, user preferences (e.g., comfort, vehicle models, vehicle seat numbers, cruise control, etc.), and/or user context, etc. For example, such an optimum shared vehicle may be the best transport mode that satisfies the requesting user's criteria (such as available now, within 1-minute walking distance, and cost less than $3).

In other embodiments, the user may decide to have some settings on or off per default in order to keep some control over the application while dealing with some other situations in which the user would want to extend a booking but is not able to. For example, when the user is in a subway train, the user is not informed or able to make a new booking due to low/no internet connectivity, the system 100 automatically extends the reservation or re-book a new reservation.

With this data along with other data such as but not limited to public transport information, the system 100 (e.g., a routing platform 105) can compute candidate route options to a destination that includes one or more segments for the user to pick up the shared vehicle, to travel via one or more transport modes, and for the user to travel to the final destination. In this way, the system 100 can more precisely present to the user transport modes to travel to the pickup point then get to the destination. In one embodiment, the UEs 101 and the routing platform 105 have connectivity via a communication network 107.

In one embodiment, the vehicles 103a-103n are equipped with a device (e.g., the UE 101 or other accessory device) that records the vehicles' trajectory data (e.g., position, speed, etc.). In one embodiment, the UE 101 may be configured with one or more sensors 110a-110n (also collectively referred to as sensors 110) for determining the trajectory data (including parking locations). By way of example, the sensors 110 may include location sensors (e.g., GPS), accelerometers, compass sensors, gyroscopes, altimeters, etc.

In one embodiment, after a journey or the trajectory data is recorded (e.g., upon parking), the trajectory data is analyzed (e.g., by respective applications 111a-111n and/or the routing platform 105 for storage in, for instance, a transportation database 113 and/or a geographic database 119) to detect parking locations where the vehicle can be reserved for the user or becomes available for new reservations. Applications 111a-111n preform navigation and/or routing functions independently or in conjunction with the routing platform 105. In one embodiment, the routing platform 105 and/or applications 111 release the vehicle as the user walking pass the vehicle, assume that the user does not want to use the vehicle, and proactively reserve a different vehicle from a current location of the user.

In one embodiment, timestamp information indicates at which time and which location the shared vehicle was parked is recorded as a record in the transportation database 113. In one embodiment, the record is then transmitted or uploaded to the routing platform 105. In addition or alternatively, the raw trajectory data may be uploaded to the routing platform 105 to determine the record. In yet another embodiment, the record and/or trajectory data may be maintained at the UE 101 device for local processing to determine vehicle parking information for transmission to the routing platform 105 and/or other vehicles/UEs 101 (e.g., when operating in a peer-to-peer network architecture).

In one embodiment, when the UE 101 requests optimal routes to pick up the vehicle 103 at or near a vehicle parking location then riding to a destination, the routing platform 105 computes candidate routes to pick up the vehicle 103 then riding to an intermediate destination or a destination, based on data from the transportation database 113 and/or the geographic database 119.

In one embodiment, the routing platform 105 determines that the user has reached the destination using the shared vehicle of the proactive reservation. In one embodiment, the routing platform 105 calculates another probability that the user will use the shared vehicle on a return journey based on the context and the profile of the user. In one embodiment, the routing platform 105 initiates an extension of the proactive reservation based on determining that the another probability meets or exceeds the threshold value, wherein the proactive reservation is extended without intervention of the user.

In one embodiment, the routing platform 105 computes a cost function for extending the vehicle reservation after reaching the destination, and a cost function for creating another vehicle reservation for another vehicle for the return journey, based on data from the transportation database 113 and/or the geographic database 119. The routing platform 105 compares costs of the two reservation options, and then presents the costs and/or recommend the cheaper reservation option. For example, when the availability meets or exceeds a threshold value and the cost of the another vehicle is lower than the cost of the vehicle, the routing platform 105 releases the vehicle, and proactively reserves the another vehicle for the return journey. On the other hand, when the cost of the another vehicle is higher than the cost of the vehicle, the routing platform 105 proactively extends the reservation of the vehicle for the return journey without user intervention. For example, some areas are isolated or at the edge of some service areas thus no shared vehicle is available, thus it is cheaper to continue the vehicle reservation than getting a shared taxi.

In one embodiment, the routing platform 105 monitors an availability of candidate vehicles from which the another vehicle can be selected, wherein the creation of the another vehicle reservation as the vehicle options is based on the availability. In one embodiment, the routing platform 105 determines that there is another intermodal route with an estimated time of arrival, a travel distance, or a combination thereof that is within a threshold similarity of the intermodal route and presents the another intermodal route as the at least one route option. In one embodiment, the routing platform 105 determines an availability of another vehicle provider to provide the another vehicle to travel the intermodal route and provides data on the another provider as the least one route option. For example, another vehicle suddenly becomes available for the user's return journey.

In one embodiment, the routing platform 105 automatically initiates the at least one vehicle option based on determining that the user location is in an area with low or no device data connectivity.

In one embodiment, the routing platform 105 considers whether to continue the vehicle reservation while the vehicle is parked at the intermediate destination, based on the following concerns: Is it likely to find other shared cars/vehicles (including autonomous, semi-autonomous, human-driven vehicles) later on when the user is leaving the intermediate destination? Does the reserved vehicle have enough space for what the user is picking up at the intermediate destination? Does the reserved vehicle have enough fuel (e.g., gasoline, battery power, or other forms of energy) to travel to the intermediate destination? How much would it cost me to keep the vehicle booked for another 2-3 hours? Would it be cheaper to release the reserved vehicle now and take a cab home later? How long it will take to use public transit to home later? To resolve these concerns, the routing platform 105 uses the historical and/or real time data to determine the shared vehicles' availability, types, and costs for the given area. The routing platform 105 allows the users to make informed decisions with regards to shared vehicles based on data that the user is not aware of because the user does not have access to such information (historical data and trends of shared vehicles). This surfaces all the available travel options for the user so that s/he can compare estimated arrival time, price and convenience considering some risk factors (e.g., the shared vehicle's availability) and leads to better user experience.

The routing platform 105 generates at least one shared vehicle option based on the probability. The shared vehicle option includes an extension the shared vehicle reservation, a creation of another shared vehicle reservation for the same shared vehicle or another shared vehicle of the same operator or a different operator at or near the shared vehicle location, a creation of another vehicle reservation for a different vehicle type (e.g., shared scooter) with a similar estimated arrival time at or near the shared vehicle location, a creation of another vehicle reservation for another vehicle at a different location, etc.

In one embodiment, the routing platform 105 is configured to monitor the user and/or the public transport in order to generate travel status information. In addition, the routing platform 105 may present to the user a real-time status of the user, and/or an estimated or predicted status of the user to arrive at a public transport location. The status information may also be associated with timestamp information and/or other contextual information (including parking) to store in the transportation database 113. In one embodiment in which timestamp information is available, for each travel or street segment of interest, the routing platform 105 retains the latest time at which the public transport departed and estimates when the user will arrive at the vehicle location.

In another embodiment, the routing platform 105 may present to the user information on points of interest, parking areas, road segments, and/or related information retrieved from the geographic database 119, while the user is traveling on the public transport mode segment and/or in the shared vehicle. In addition or alternatively, such information can be provided by the service platform 109, one or more services 109a-109m (also collectively referred to as services 109), one or more content providers 115a-115k (also collectively referred to as content providers 115), or a combination thereof. For example, the sources of the information may include map data, information inferred from data collected from participating vehicles, or a combination thereof.

In one embodiment, apart from an optimal or recommended candidate route option, the routing platform 105 may also update the information as a map overlay that illustrates, for instance, timestamps, a number of transport modes available, and fluctuations in the amount of transport modes, etc. around the user location or position (e.g., a current location of the client UE 101), based on real-time transport data from the transportation database 113.

In one embodiment, vehicles 103 are equipped with a navigation device (e.g., a UE 101) that is capable of submitting to the routing platform 105 requests for routing the user to the reserved vehicle, the intermediate destination, and/or the destination. In one embodiment, as the user and the public transport follow the respective segments, the UE 101 (e.g., via an application 111) and the public transport may iterate their locations with timestamps to the routing platform 105 in order to update the travel status in a real-time and/or substantially real-time manner while factoring in delay caused by traffic, weather, etc.

In one embodiment, a reservation change can be automatically done/triggered/initiated when inferring the user's need to change vehicle reservation from user profile information and/or user context information. In yet another embodiment, the UE 101 can initiate a reservation change request when the UE 101 detects that the user mentions a changing vehicle reservation need in an email, calendar entry, web post, etc. In this way, vehicle reservation change can be made even when no explicit reservation change request is set or known by the system 100.

As shown in FIG. 1A, the routing platform 105 operates in connection with UEs 101 and vehicles 103 for proactive booking of a shared vehicle. By way of example, the UEs 101 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101 may be configured to access a communication network 107 by way of any known or still developing communication protocols. Via this communication network 107, the UE 101 may transmit probe data as well as access various network based services for facilitating proactive booking of a shared vehicle.

Also, the UEs 101 may be configured with applications 111 for interacting with one or more content providers 115, services of the service platform 109, or a combination thereof. Per these services, the applications 111 of the UE 101 may acquire routing instructions, transport mode information, traffic information, mapping information and other data associated with the current locations of the user and the vehicle, etc. Hence, the content providers 115 and service platform 109 rely upon the gathering of user, vehicle, and transport modes trajectory data and routing data for executing the aforementioned services.

The UEs 101 and the vehicles 103 may be configured with various sensors 110 for acquiring and/or generating trajectory data regarding the user, a vehicle, other vehicles, conditions regarding the driving environment or roadway, etc. For example, sensors 110 may be used as GPS receivers for interacting with one or more satellites 117 to determine and track the current speed, position and location of a user and/or a vehicle travelling along a roadway. In addition, the sensors 110 may gather tilt data (e.g., a degree of incline or decline of the vehicle during travel), motion data, light data, sound data, image data, weather data, temporal data and other data associated with UEs 101 and/or the vehicle 103 thereof. Still further, the sensors 110 may detect local or transient network and/or wireless signals, such as those transmitted by nearby devices during navigation of a vehicle along a roadway. This may include, for example, network routers configured within a premise (e.g., home or business), another UE 101 or vehicle 103 or a communicable traffic system (e.g., traffic lights, traffic cameras, traffic signals, digital signage). In one embodiment, the routing platform 105 aggregates probe data gathered and/or generated by the UEs 101 and/or the vehicle 103 resulting from the driving of multiple different vehicles over a road/travel network. The probe data may be aggregated by the routing platform 105 to proactively book a shared vehicle.

By way of example, the routing platform 105 may be implemented as a cloud based service, hosted solution or the like for performing the above described functions. Alternatively, the routing platform 105 may be directly integrated for processing data generated and/or provided by service platform 109, content providers 115, and/or applications 111. Per this integration, the routing platform 105 may perform candidate routes calculation based on user/vehicle trajectory information and/or public transport information.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101, the vehicles 103, the routing platform 105, the service platform 109, and the content providers 115 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
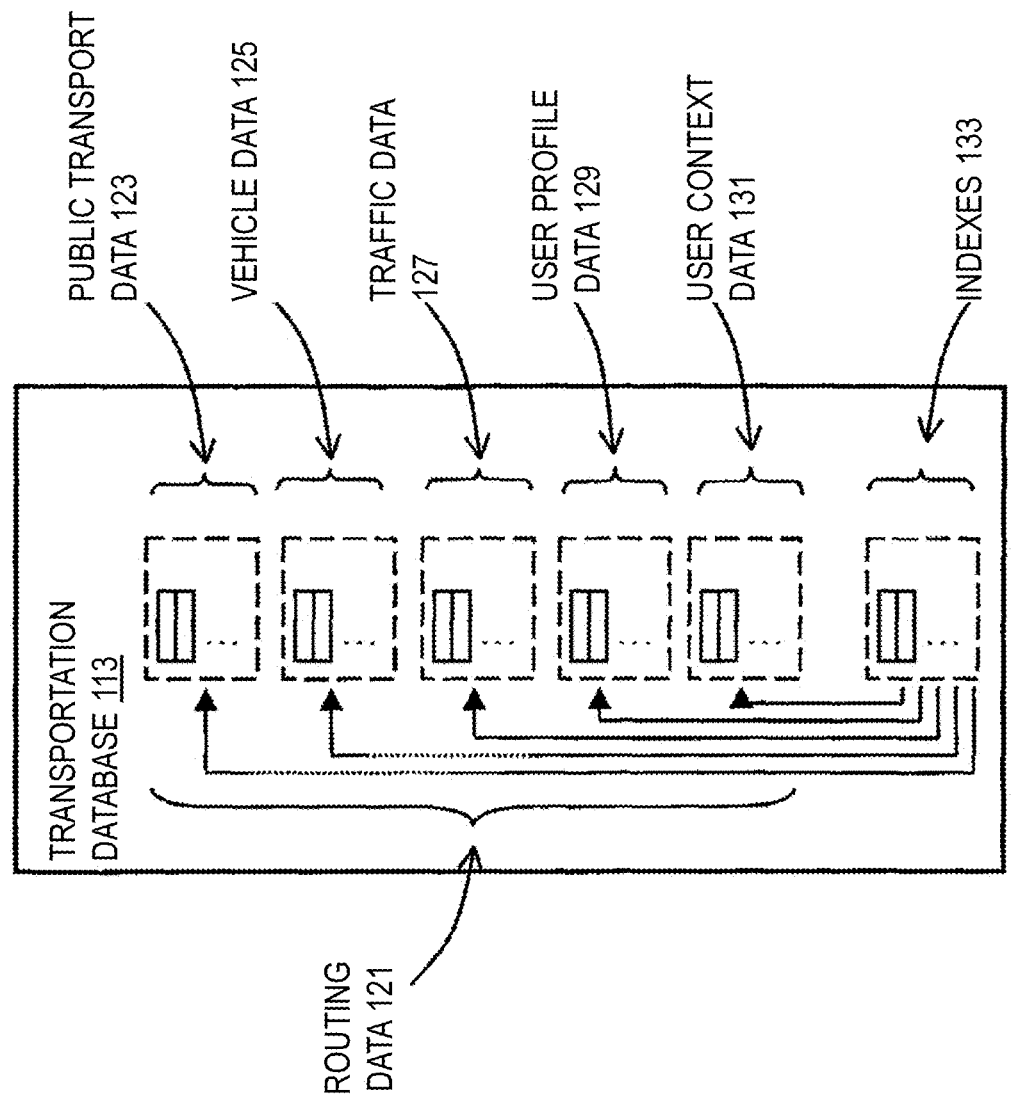
FIG. 1B is a diagram of a transportation database, according to one embodiment.

FIG. 1B is a diagram of the transportation database 113, according to one embodiment. In one embodiment, vehicle information and/or any other information used or generated by the system 100 with respect to proactively book a shared vehicle based on routing data 121 stored in the transportation database 113 and associated with and/or linked to the geographic database 119 or data thereof.

In one embodiment, the routing data 121 include public transport data 123, vehicle data 125, traffic data 127, user profile data 129, user context data 131, indexes 133, etc. In one embodiment, the public transport data 123 can include any public transport data item used by the routing platform 105 including, but not limited to public transport type data, public transport schedule data, public transport route and stop data, real-time public transport trajectory data, etc. retrieved from transit agencies, public transportation operators, etc. In one embodiment, the public transport data can be used in junction with the user profile data 129 and the user context data 131 for selecting shared vehicle options for the user to ride to an intermediate destination (e.g., a subway station) and making a vehicle reservation and/or a creation of another vehicle reservation for another vehicle. In another embodiment, the traffic data 127 is included for estimating the estimated arrival time for the user to arrive at the intermediate destination and to catch another transport mode from there. The public transport data format may be in General Transit Feed Specification (GTFS), REST/XML, or other industry standards for publishing transportation network and schedule data. In one embodiment, the public transport can include but is not limited to on-demand services (e.g., taxis, shared vehicles, etc.) and fixed-route services such as city buses, trolleybuses, trams (or light rail) and passenger trains, rapid transit (metro/subway/underground, etc.), ferries, airlines, coaches, intercity rail, etc.

In one embodiment, the vehicle data 125 can include any vehicle data item used by the routing platform 105 including, but not limited to booking policy data, vehicle type data, vehicle ownership data, vehicle route and step data, real-time vehicle trajectory data, parking instance data, timestamp information for the parking instance data, etc. for selecting shared vehicle options for the user to ride to an intermediate destination, and making a vehicle reservation and/or a creation of another vehicle reservation for another vehicle. In another embodiment, the traffic data 127 is further included for estimating the estimated arrival time for the user to arrive at the intermediate destination and to catch another transport mode from there.

In one embodiment, the booking policy data is collected from various shared vehicle companies, such as duration, number of times, costs, etc. For example, a booking policy limits by duration or number of times (e.g., booking limited to 40 min or 2 bookings per day). Another booking policy limits the booking contextually, i.e., based on the availability of vehicles in a given area, such as not restrict bookings when there are more than three vehicles available at a pickup location, otherwise apply more restrictive booking policies. Another booking policy takes user's personal situations into account. When this is the only vehicle available for the user to travel the journey, the reservation time frame is more flexible. When a rebooking is due to some unavoidable delay, the reservation time frame is more flexible. Another booking policy considers available mobility packages, such as Mobility-as-a-Service (MaaS) which combines transportation services from public and private transportation providers through a unified gateway that creates and manages the trip, which users can pay for with a single account.

In one embodiment, the traffic data 127 includes, but not limited to, travel speeds, congestions, detours, vehicle types and volumes, accidents, road conditions, road works, etc. on specific road segments.

In one embodiment, the user profile data 129 includes, but not limited to, shared vehicle service registration information, preferred shared vehicle type, model, and service information, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, etc. of the user.

In one embodiment, the user context data 131 includes, but not limited to, a destination of the user, a type of the destination of the user, a proximity of the user location to a vehicle pickup location, the intermediate destination, or the destination, availability of an alternate destination for the user, a number of passengers accompanying the user, weather data in the vicinity of the user, etc.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or navigation data).

In one embodiment, the geographic database 119 includes geographic data used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 119 includes node data records, road segment or link data records, POI data records, parking availability data records, and other data records.

In exemplary embodiments, the road segment data records are links or segments representing roads, streets, or paths, as can be used in the calculated route or recorded route information. The node data records are end points corresponding to the respective links or segments of the road segment data records. The road link data records and the node data records represent a road network, such as used by vehicles, cars, and/or other entities. Alternatively, the geographic database 119 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 119 can include data about the POIs and their respective locations in the POI data records. The geographic database 119 can also include data about places, such as cities, towns, or other communities, and other geographic features, such as bodies of water, mountain ranges, etc.

The transportation database 113 and/or the geographic database 119 can be maintained by the content provider in association with the service platform 109 (e.g., a map developer). The map developer can collect driving/parking data and geographic data to generate and enhance the transportation database 113 and/or the geographic database 119. There can be different ways used by the map developer to collect data. These ways can include obtaining data from other sources, such as municipalities or respective geographic authorities.

The transportation database 113 and/or the geographic database 119 can be stored in a format that facilitates updating, maintenance, and development of the relevant data. For example, the data in the transportation database 113 and/or the geographic database 119 can be stored in an Oracle spatial format or other spatial format. The Oracle spatial format can be compiled into a delivery format, such as a geographic data files (GDF) format to be compiled or further compiled to form geographic database products or databases, which can be used in end user navigation devices or systems.

As mentioned above, the transportation database 113 and the geographic database 119 are separated databases, but in alternate embodiments, the transportation database 113 and the geographic database 119 are combined into one database that can be used in or with end user devices (e.g., UEs 101) to provide navigation-related functions and provide shared vehicle information. For example, the databases 113, 119 are accessible to the UE 101 directly or via the routing platform 105. In another embodiments, the databases 113, 119 can be downloaded or stored on UE 101, such as in applications 111.

FIG. 2 is a diagram of the components of a routing platform, according to one embodiment. By way of example, the routing platform 105 includes one or more components for proactive booking of a shared vehicle. It is contemplated that the functions of these components may be combined or performed by other components of equivalent functionality. In this embodiment, the routing platform 105 includes an authentication module 201, a public transport module 203, a vehicle module 205, a processing module 207, a communication module 209, and a user interface module 211.

In one embodiment, the authentication module 201 authenticates UEs 101 and/or associated vehicles 103 for interaction with the routing platform 105. By way of example, the authentication module 201 receives a request to access the routing platform 105 via an application 111. The request may be submitted to the authentication module 201 via the communication module 209, which enables an interface between the application 111 and the platform 105. In addition, the authentication module 201 may provide and/or validate access by the UE 101 to upload trajectory data, and/or other location-based information to the platform 105. In one embodiment, the authentication module 201 may further be configured to support and/or validate the formation of profile by a provider of a service 109 or content provider 115, e.g., for supporting integration of the capabilities for proactive booking of a shared vehicle with said providers 115 or services 109.

The public transport module 203 retrieves the public transport data 123 (including fixed-route and/or on-demand public transports and associated schedules and timestamps) from various sources such as the transportation database 113, transit agencies, public transportation operators, etc. In one embodiment, the public transport module 203 aggregates schedules of various public transport that are operated on fixed schedules. In another embodiment, the public transport module 203 analyzes trajectory data (including associated timestamps) uploaded by one or more authenticated public transport passenger UE 101 and/or various public transport (e.g., demand-responsive transit, such as flexible routing and/or flexible scheduling minibuses) to determine the status of the transports that operate on demand. In one embodiment, the public transport module 203 may receive other related data along with the trajectory data or segment lists such as acceleration, road curvature, vehicle tilt, driving mode, brake pressure, etc. It then stores the received data to database 113 optionally in association with a unique identifier of the various public transport that transmitted the trajectory data.

The vehicle module 205 collects and/or analyzes trajectory data (including associated timestamps) as generated by one or more authenticated UE 101 and one or more vehicles 103. For example, the vehicle module 205 aggregates the trajectory data of travel segments generated by the UE 101 and the one or more vehicles 103. In one embodiment, the vehicle module 205 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101 that transmitted the trajectory data or lists.

In one embodiment, the processing module 207 manages a vehicle reservation used in an intermodal route that includes a walking segment to a vehicle booked via the vehicle reservation, and another segment to an intermediate destination or a final destination.

In one embodiment, the processing module 207 calculates a probability that the user will use a transport mode employing the shared vehicle for a route segment to the intermediate destination (e.g., a subway station) or the destination (e.g., home) based on a context and a profile of the user. For example, the processing module 207 calculates a probability D which a joint probability distribution or matrix for parameters X, Y, Z . . . that gives the probability that each of X, Y, Z . . . falls in any particular range or discrete set of values specified for that variable. For example, X is a user's profile parameter (e.g., three of four times that the user rode on an e-scooter to the subway station and one out of four times that the user rode on a bicycle to the subway station), and Y is a is a user's context parameter (e.g., half of the times carrying a backpack vs. half of the times carrying a briefcase). To simplify the discussion, only X and Y are used to generate a joint probability distribution or matrix as Table 1 as follows:

TABLE 1

|  | X = e-scooter | X = bicycle | P (X) |
|---|---|---|---|
| Y = backpack | (½)(¾) = ⅜ | (½)(¼) = ⅛ | ⅜ + ⅛ = ½ |
| Y = Briefcase | (½)(¾) = ⅜ | (½)(¼) = ⅛ | ⅜ + ⅛ = ½ |
| P (Y) | 38 + 38 = 34 | 18 + 18 = 14 | |

In one embodiment, when the probability that the user will use the vehicle to travel to the subway station (e.g., 75%) exceeds a threshold value (e.g., 60%), the processing module 207 proactively reserves the e-scooter before the user reaches the e-scooter. The processing module 207 continues monitoring the user location as well as calculating the probability that the user will reach the vehicle, until the user reaches the vehicle location.

In another embodiment, when the probability that the user will reach the vehicle gets below the threshold value (e.g., 25%), such as when the user passes the vehicle or when the user takes a segment that will not pass the vehicle, the processing module 207 creates another vehicle reservation for another vehicle, etc., to minimize the cost function to travel to the intermediate destination or the destination.

In another embodiment, the processing module 207 considers other information that the user may not be aware in the probabilistic determination. For example, based on real-time transport data from the transportation database 113, the processing module 207 determines some disruptions on the subway line, and proactively extends the bicycle reservation after the user drops off the bicycle at the subway station, in case that the user may walk out of the subway station to search for alternative transport and will be happy to have the bicycle proactively reserved for the user.

In another embodiment, when the user approach the vehicle location, the processing module 207 asks the user whether to take the existing reservation and/or make a new reservation for a different vehicle. If the user chooses "take the existing reservation", the reserved vehicle would remain reserved for the user. If the user chooses "make a new reservation", the reserved vehicle would be released and advertised as available for another user. If the user chooses "take the existing reservation" and "make a new reservation", the reserved vehicle would remain reserved for the user, while another vehicle is also reserved for the user as a backup.

As the described idea is about determining a probability that the user will take a shared vehicle, the processing module 207 would monitor other factors that influence this probability. The processing module 207 can monitor the user's profile and historic and current transportation data and computes the probability accordingly. If no or fewer data is available, then the uncertainty increases.

Probability is the measure of how likely an event is to occur out of the number of possible outcomes. There exist infinitely many outcomes among many shared vehicles in the vicinity of the user. To simplify the discussion, the probability D in this case, can be identified with a triple (x,y,z) that specifies the probabilities that the user will take the first vehicle en route to the subway station. x+y+z=1 and x, y, z are positive. In one embodiment, the other outcomes are not of interest for computing the probability D that the vehicle will become available for the user. In another embodiment, the other outcomes have no statistical significance for computing the probability D that the vehicle will become available for the user.

There also exist infinitely many triples (x,y,z) that satisfy the conditions above (for examples are x=z=⅖, y=⅕ and x=⅓, y=⅙, z=½). Each probability P of an outcome is a combined probability of a series of concurrent and/or sequential events that lead to the outcome P (x and y and z)=P (x)×P (y)×P (z). For example, the outcome of the user reaching the pickup location p requires: the reserved vehicle is available at the reserved time frame (x), the vehicle location is en route to the subway station (y), and the subway station can be reached via the reserved vehicle within a time threshold (z). By analogy, each probability of an event x, y, or z is a combined probability of a series of concurrent and/or sequential sub-events that lead to the event x, y, or z.

In one embodiment, the processing module 207 includes more parameters including additional user's context parameters such as user calendar, user activity, etc., and/or additional user's profile parameters such as vehicle reservation history, etc., to calculate the probability D that the user will reach the vehicle to ride to the subway station, until the user reaches the vehicle location. When the probability D meets or exceeds a threshold value (e.g., 60%), the processing module 207 continues monitoring the user location as well as calculating the probability that the user will reach the vehicle for presenting the share vehicle at the location on a user interface to the user.

The above-discussed embodiments refer to shared vehicle as examples. These embodiments are applicable to centralized ride-sharing, peer-to-peer ride-sharing, car-pooling, taxi cabs, food delivery, etc.

In one embodiment, the processing module 207 generates at least one route option based on the probability. The at least one route option includes keeping the vehicle reservation, and/or a creation of another vehicle reservation for another vehicle.

In one embodiment, the processing module 207 computes a cost function score for each of the share vehicle candidates via comparing a plurality of features of respective candidates to the plurality of features of the reserved vehicle to determine a number of common features (n) shared between the plurality of features of the respective candidates and the plurality of features of the reserved vehicle, and calculating the cost function score using an equation including a weighting vector (w), the reserved vehicle feature vector (r), a respective candidate feature vector (p):

$$\text{cost}(r, p) = \sum_{i=1 \to n} w_i r_i p_i$$

where i=1 to the number of common features shared between the reserved vehicle vector and the candidate feature vectors.

In one embodiment, the vehicle features include a vehicle type (e.g., cars, motorcycles, electric bikes, electric scooters, bicycles, boats, airplanes, etc.), a vehicle model, relevant reservation criteria (e.g., a reservation fee, a reservation time length, a number of concurrent reservation limit, etc.), usage cost (e.g., rental fee per minute, per 30 minutes, per hour, per day, per week, per month, etc.), promotions (e.g., the first 30 minutes free for a new user, a bonus if returning to the pickup location or preferred locations, premium customers can re-book more times than standard users or for a longer period, etc.), dropping off criteria (e.g., distance, location, area limitations), the vehicle pickup location with respect to a stop of the alternate transport mode, the route to the final destination of the user, alternative vehicle pickup locations, user preferences, consumer ratings of the vehicle and/or operator, predictive and/or live traffic near the user destination, scheduling of the alternate transport mode, etc.

By way of example, a tourist walks from the Washington Monument towards the Smithsonian Metro train stop in order to take the subway from downtown Washington D.C. to the airport. The processing module 207 generates a list of one or more share vehicle candidates based on cost function scores. In one embodiment, the processing module 207 automatically executes the optimal shared vehicle from the list for the user. In another embodiment, the processing module 207 presents the list on a user interface in an order from the preferred ones on the top and prompts for a user selection. In one embodiment, once the share vehicle options are determined, the processing module 207 can interact with the communication module 209 and/or the user interface module 211 to present to the user the share vehicle options. After the user selects a share vehicle option, the processing module 207 can interact with the communication module 209 and/or the user interface module 211 to present to the user updated reservation and timing information, related navigation instructions, and/or other information related to the vehicle timing and vehicle navigation information.

The processing module 207 monitors the user location as well as the vehicle fees and availability (including all docked and dockless bicycles of different carriers, etc.) near and en route to Smithsonian Metro train stop. For example, the processing module 207 prompts the user to reserve a different bicycle when the user skips the first reserve vehicle.

The processing module 207 provides the user vehicle data of the share vehicle option (e.g., vehicle type, model, fees, operation limits, etc.), and optionally timing information. In one embodiment, the processing module 207 provides to the user navigation instructions, and/or other information to the user to locate the share vehicle.

Since there can be delays caused by predictive and/or live traffic, weather, etc. for the user, the processing module 207 updates the user location, the public transport location, or a combination thereof based on data from the transportation database 113 that is obtained via real-time monitoring by the system 100. In one embodiment, the processing module 207 updates the probability calculation and the cost function scores based on the updated user location and/or public transport location, as well as updates the list of share vehicle candidates.

It is further noted that the user interface module 211 may operate in connection with the communication module 209 to facilitate the exchange of real-time location information and/or transport mode information via the communication network 107 with respect to the services 109, content providers 115 and applications 111. Alternatively, the communication module 209 may facilitate transmission of the real-time location information and/or the transport mode information directly to the services 109 or content providers 115.

The above presented modules and components of the routing platform 105 can be implemented in hardware, firmware, software, or a combination thereof. Though depicted as a separate entity in FIG. 1A, it is contemplated that the platform 105 may be implemented for direct operation by respective UEs 101 and/or vehicles 103. As such, the routing platform 105 may generate direct signal inputs by way of the operating system of the UE 101 and/or vehicles 103 for interacting with the application 111. In another embodiment, one or more of the modules 201-211 may be implemented for operation by respective UEs 101 and/or vehicles 103 as a platform 105, cloud based service, or combination thereof.

Figure 3:
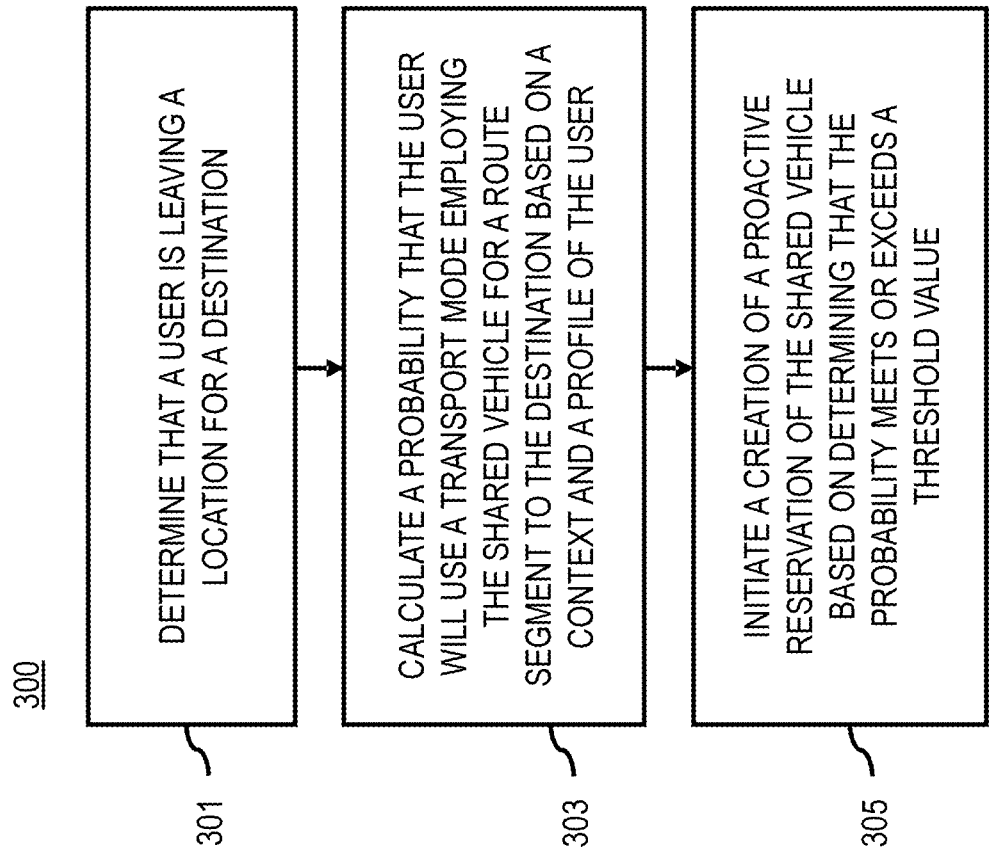
FIG. 3 is a flowchart of a process for proactive booking of a shared vehicle, according to one embodiment.
Figure 9:
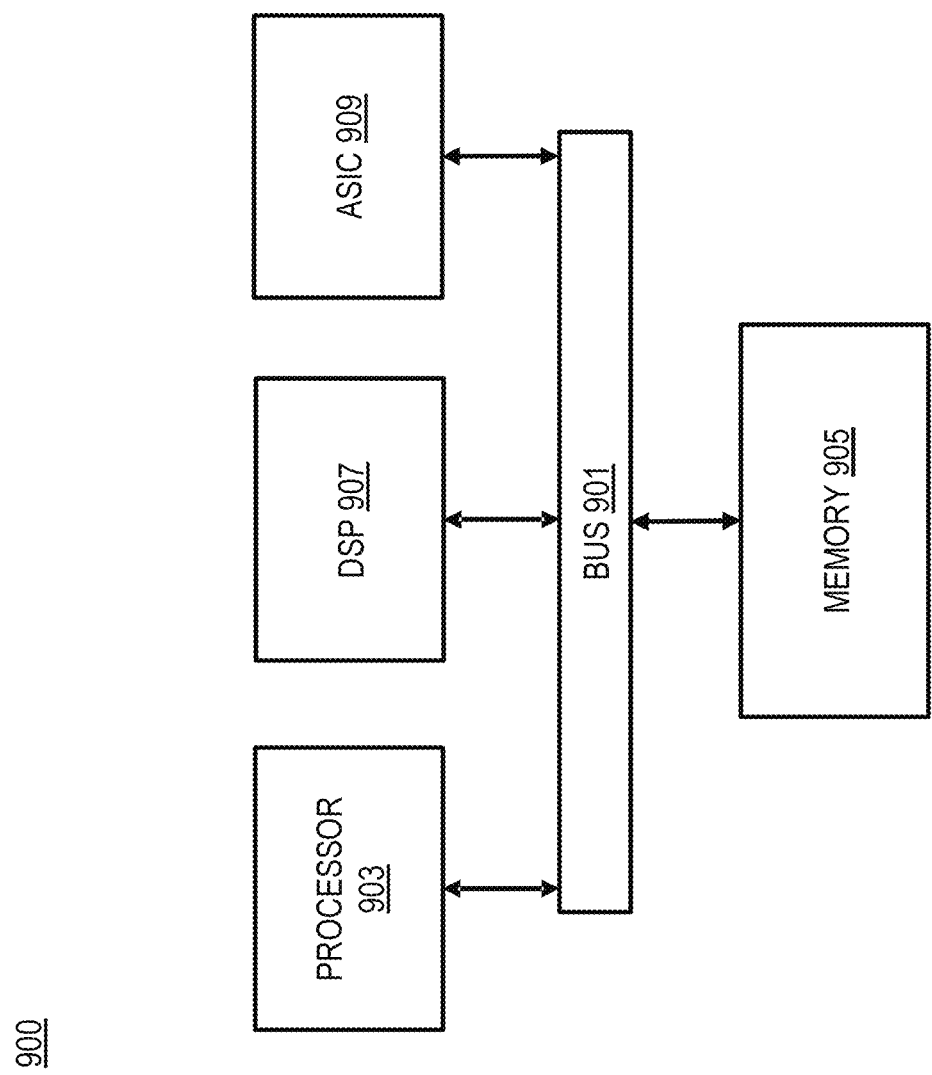
FIG. 9 is a diagram of a chip set that can be used to implement an embodiment of the invention.

FIG. 3 is a flowchart of a process for proactive booking of a shared vehicle, according to one embodiment. In one embodiment, the routing platform 105 performs the process 300 and is implemented in, for instance, a chip set including a processor and a memory as shown in FIG. 9. In addition or alternatively, all or a portion of the process 300 may be performed locally at the UE 101 and/or vehicle 103 (e.g., via the application 111 or another equivalent hardware and/or software component).

In one embodiment, routing platform 105 presents routes to the user, and the user can select a route based on the number of available vehicles. A route with more vehicle options could be more attractive to some users since there are more vehicle options to choose later. For example, at each intersection, the user can discover all the vehicle options available on each street by pointing at one direction. In another embodiment, the user may also decide to prioritize a walk route over another one based on the vehicle options presented.

Figure 4A:
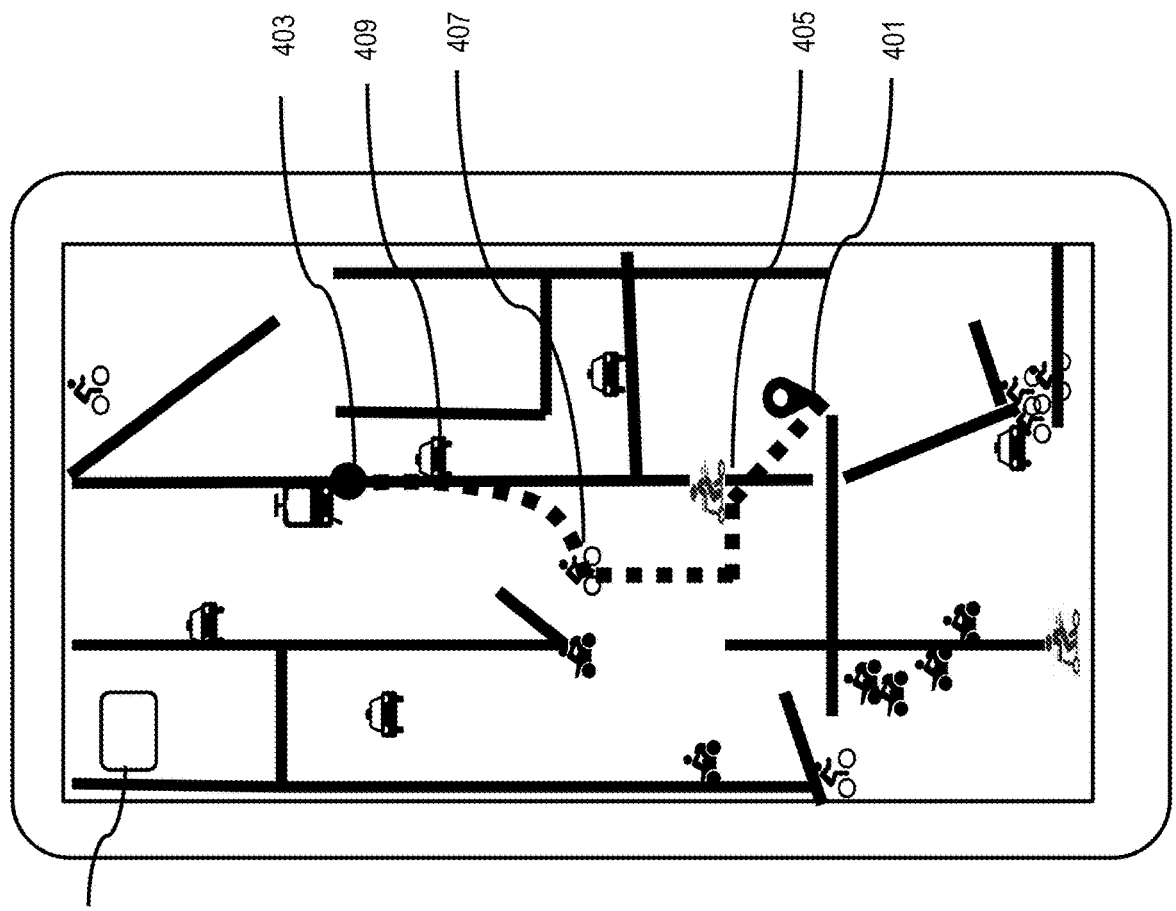
FIGS. 4A-4B are diagrams of user interfaces used in the processes for proactive booking of a shared vehicle, according to various embodiments.

In step 301, the routing platform 105 determines that a user is leaving a location 401 for a destination 403 (e.g., a subway station). FIG. 4A is a diagram of a user interface 400 used in the processes for proactive booking of a shared vehicle, according to one embodiment. As shown in FIG. 4A, there are three shared vehicles: an e-scooter 405, a bicycle 407, and a car 409 available and en route to the destination 403. When a presentation switch icon 411 is selected, the routing platform 105 switches the presentation among a two-dimensional user interface, a three-dimensional user interface, an augmented reality user interface, etc.

Figure 4B:
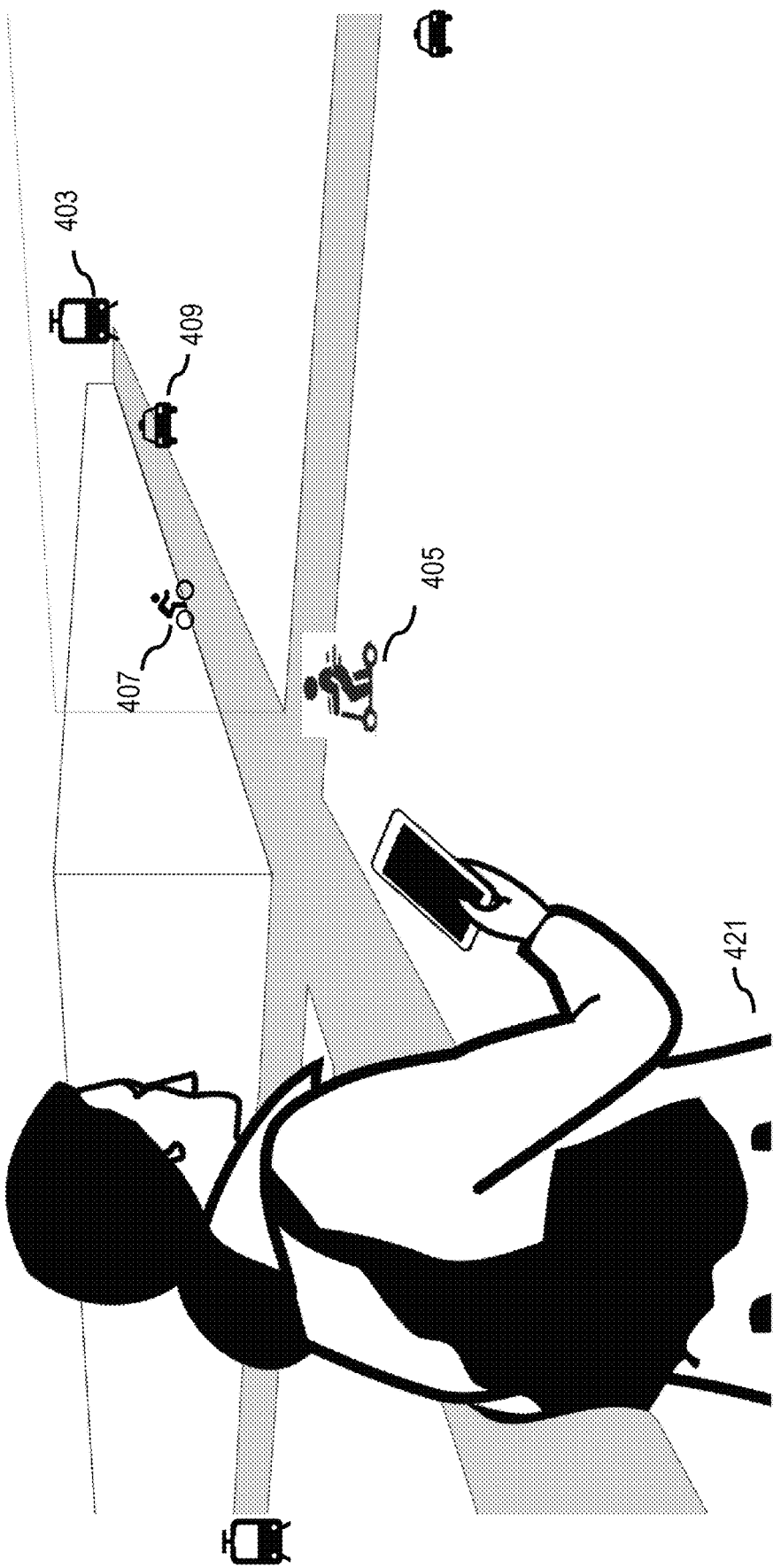

FIG. 4B is a diagram of a user interface 420 used in the processes for proactive booking of a shared vehicle, according to one embodiment. For example, upon the selection of the presentation switch icon 411 in FIG. 4A, the presentation switches from the two-dimensional user interface 400 into a three-dimensional user interface 420 augmented with an human graphic FIG. 421, which can be an photo of the user, an avatar with the user's look, an avatar of other look, etc., that matches with the current location and orientation of the user in the physical world.

Figure 5:
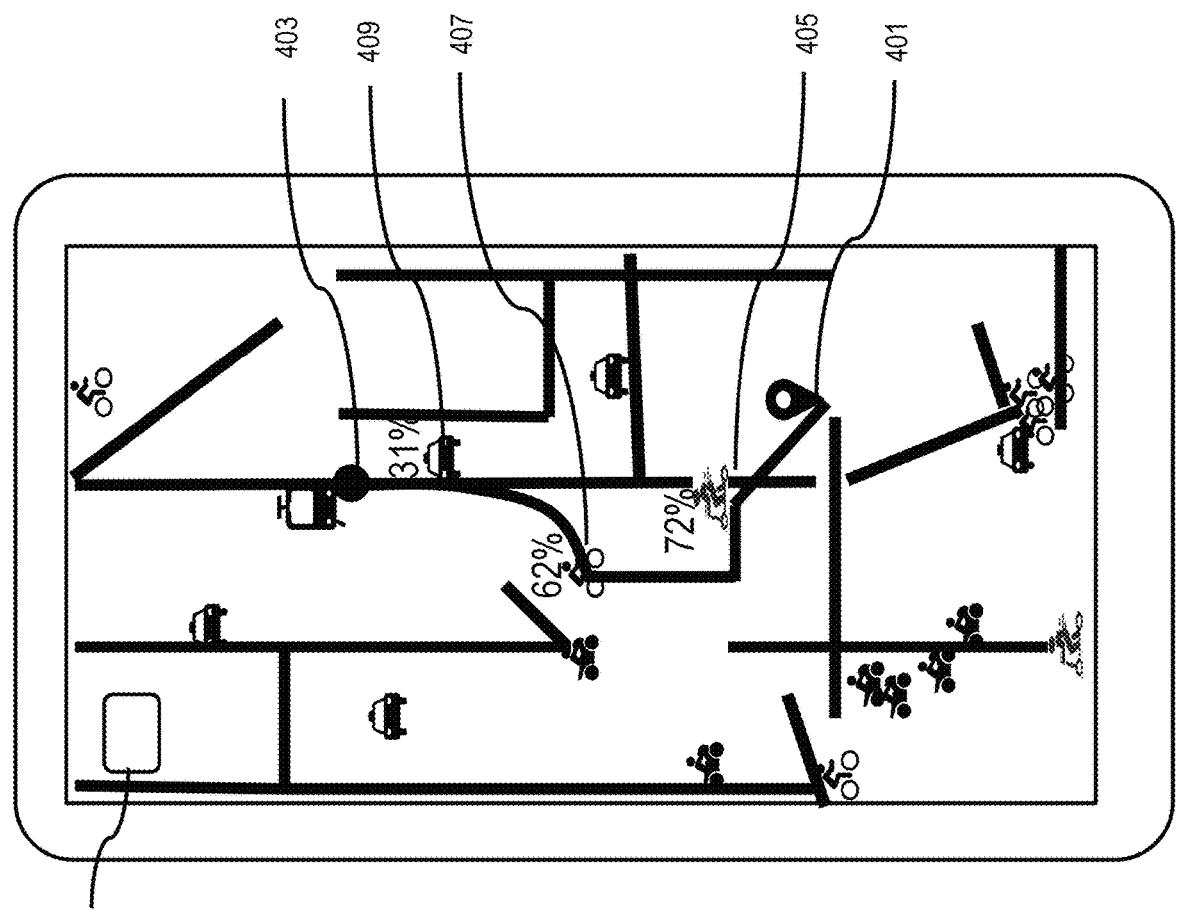
FIG. 5 is a diagram of a user interface used in the processes for proactive booking of a shared vehicle, according to one embodiment.

In step 303, the routing platform 105 calculates a probability that the user will use a transport mode employing the shared vehicle for a route segment to the destination based on a context and a profile of the user. FIG. 5 is a diagram of a user interface 500 used in the processes for proactive booking of a shared vehicle, according to one embodiment. For example, the routing platform 105 calculates the probability for each en route vehicle, considering the user destination, the user's heading, the user's travel pattern history (e.g., the commonly taken routes, transport modes, etc.), the user's preferences (e.g., which transport mode is preferred under which context), the user's familiarity index with the area (e.g., a mobility graph), the user's calendar (e.g., where and when the user needs to be at a given time), etc. As shown in FIG. 5, the probability for the user to use the three shared vehicles en route to the destination 403: the e-scooter 405 as 72%, the bicycle 407 as 62%, and the car 409 as 31%.

In step 305, the routing platform 105 initiates a creation of a proactive reservation of the e-scooter 405 based on determining that the probability 72% (e.g., on a sunny day and a 4 km trip the user generally prefers driving a scooter) exceeds a threshold value 60%. The proactive reservation is created without intervention of the user. Since probability for the bicycle 407 62% also exceeds the threshold value 60%, the routing platform 105 can proactively book the bicycle 407 for the user as well.

The routing platform 105 deploys various vehicle reservation strategies depending on the cost function, user preferences (e.g., comfort, vehicle models, vehicle seat numbers, cruise control, etc.), and/or user context, etc.

Figure 6:
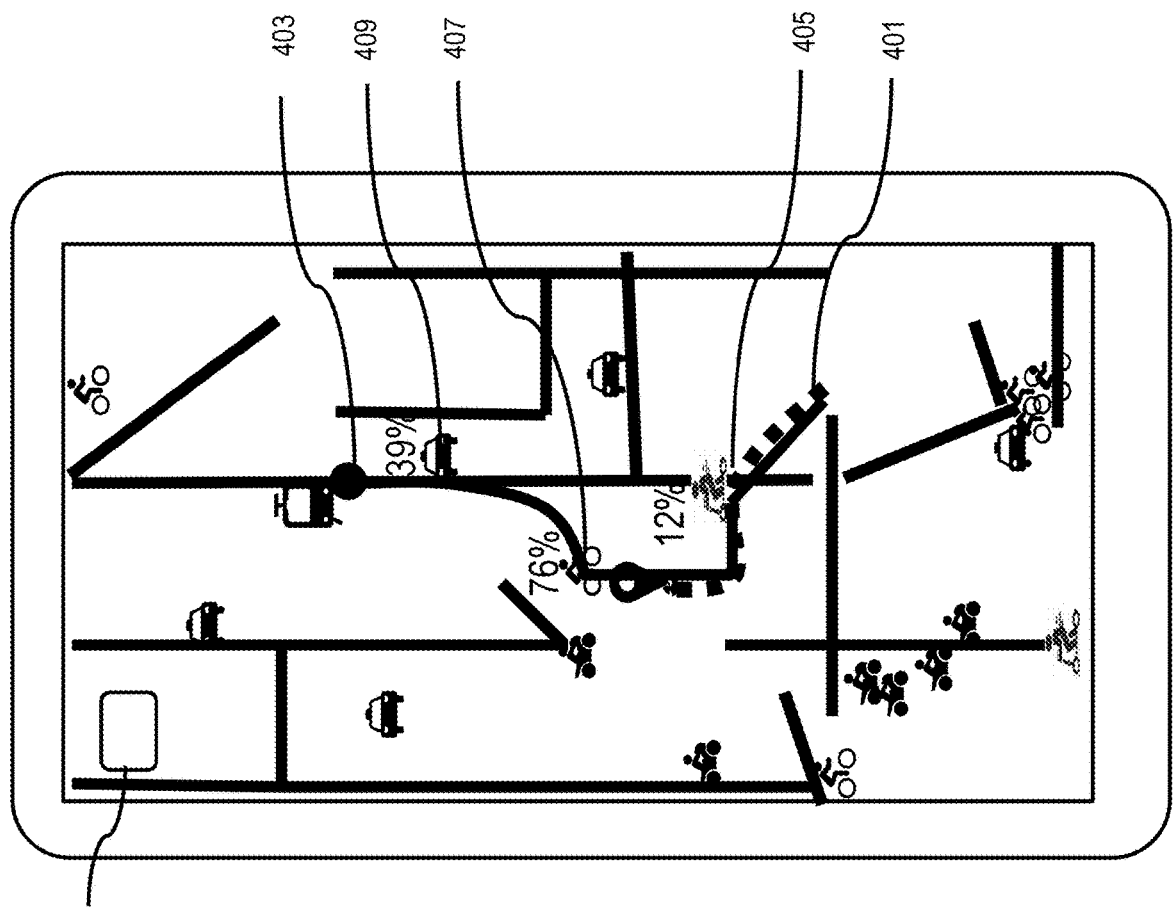
FIG. 6 is a diagram of a user interface used in the processes for proactively cancelling the shared vehicle reservation and booking another vehicle, according to one embodiment.

FIG. 6 is a diagram of a user interface 600 used in the processes for proactively cancelling the shared vehicle reservation and booking another vehicle, according to one embodiment. As the user starts walking and hence makes implicit decisions on which path to take and which vehicles not to use, the probability values are dynamically adjusted accordingly. Once the probability goes under some value (e.g., <20%) for a given time (e.g., 2 minutes), then the routing platform 105 *m* can decide to cancel the proactive reservation made for the user.

For example, after determining that the user has passed a location of the e-scooter 405 by a threshold distance (e.g., 20 feet), the routing platform 105 re-calculates the probability for the user to use the three shared vehicles en route to the destination 403: the e-scooter 405 as 12%, the bicycle 407 as 76%, and the car 409 as 39%. The routing platform 105 initiates a cancellation of the proactive reservation of the e-scooter 405, and creates of a proactive reservation of the bicycle 407, since the probability 76% meets or exceeds a threshold value 60%.

Figure 7:
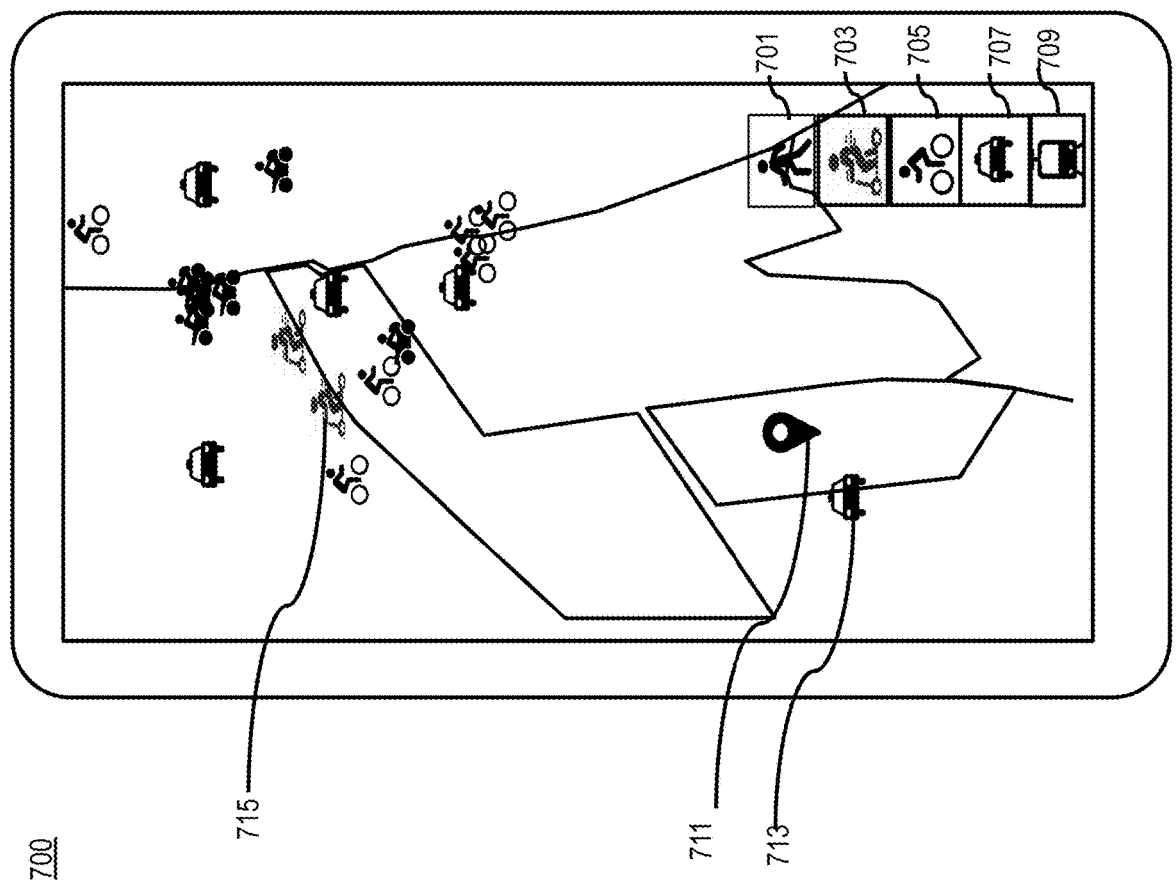
FIG. 7 is a diagram of a user interface used in the processes for proactively managing shared vehicle reservations for a return journey, according to one embodiment.

FIG. 7 is a diagram of a user interface 700 used in the processes for proactively managing shared vehicle reservations for a return journey, according to one embodiment. FIG. 7 shows five transport mode icons: a walking mode icon 701, a shared electric scooter mode icon 703, a shared bicycle mode icon 705, a shared car mode icon 707, and a subway mode icon 709. The user can select any one or more of the modes to show the available transport modes on the user interface 700. For example, the routing platform 105 determines that the user has reached the destination 711 using a shared vehicle 713 of the proactive reservation. The routing platform 105 calculates another probability that the user will use the shared vehicle on a return journey based on the context and the profile of the user. In this case, the routing platform 105 initiates an extension of the proactive reservation of the car 713 based on determining that the another probability meets or exceeds the threshold value (e.g., since no other vehicle will be available for the return journey due the remoteness of the destination 711). In one embodiment, the proactive reservation is extended without intervention of the user. In another embodiment, the proactive reservation is made in response to a user selection.

For example, the routing platform 105 calculates and compares estimated arrival times, prices, availability (e.g., public transport 99%, another shared vehicle 25% matching the user's need in 3 hours, etc.), and details for all options, then provides reservation recommendations regarding shared vehicles to the user:

"You should keep this car booked for you if you stay here less than one hour because it is not likely that you will have a free vehicle then. There are only 2 available at the moment but the trend indicates they will likely be taken. This will cost you 2 euro of parking fees per hour to keep the vehicle booked.

If you stay more than one hour, you should release this car and your options are to take a Taxi (25 euro, ETA will be 15 min) or a public transport (3 euro, ETA will be 50 min).

If you are flexible, we could automatically notify you when there is only one car left within 200 meters so you can book it.

Which option you prefer?"

The routing platform 105 monitors vehicle availability and trends at the destination 711. When the routing platform 105 determines that an e-scooter 715 is coming in 20 minutes and a free booking of the car 713 will expire in 15 minutes, the routing platform 105 makes a proactive cancelling of the current booking the car 713 to secure the e-scooter 715, knowing that this new booking should allow the user's return journey. In this case, the routing platform 105 makes a booking with a different provider.

The routing platform 105 continues monitors real-time user/subway location, and calculates a probability that the user will reach the subway station 403 using the e-scooter 715. In one embodiment, the routing platform 105 periodically or continuously calculates the probability based on real-time user/subway train location data.

In one embodiment, the routing platform 105 calculates a cost of the extension of the vehicle reservation based on the user location and provides data on the cost to the user before initiating the extension of the vehicle reservation. In another embodiment, the routing platform 105 automatically initiates the extension of the vehicle reservation based on determining that there are no other available vehicle options.

The computation of the different embodiments mentioned previously can be done partially or totally on servers/cloud, or at the edge of the network in order to balance the network load/cellular usage.

The above-discussed embodiments provide vehicle-sharing experiences which are extremely convenient and intuitive for users while on-the-go.

The above-discussed embodiments allow users to see the number of vehicle-sharing options available for the user on the way to a station and automatically reserve the shared vehicle most convenient for the use thus optimizing travel efficiency.

The above-discussed embodiments allows users to benefit from dynamic and intuitive vehicle booking by learning the user's mobility patterns and shared vehicle preferences via detecting the most likely vehicles to be used and the automatic booking of some of them once a threshold value is reached.

The above-discussed proactive booking secures the vehicle for the user such that the most interesting travel options remain available to this user, makes the on-boarding faster for this user when reaching the vehicle, and makes the user feels like having a personal assistant working things out for the user.

The above-discussed embodiments increase usage of the vehicles by reserving them for the users. The above-discussed embodiments allow the vehicles being dynamically reserved with a low cost or no cost, considering the cost function, user preferences (e.g., comfort, vehicle models, vehicle seat numbers, cruise control, etc.), and/or user context, etc.

The above-discussed embodiments real-time monitor the travel status of the user and adjust the reservation. The above-discussed embodiments cost effectively reserve another vehicle or to keep the reserved vehicle in parked/pause mode for a return journey, when the user reaches an intermediate destination.

The above-discussed embodiments allow users to always use the most efficient return journey by monitoring, validating and managing vehicle reservations.

The above-discussed embodiments enable new user experiences using smart intermodal routing with proactive booking capabilities. The complexity of the bookings can be made simple for the user by being automated, extended when needed, all in the background and taking into account the constraints of the transports and providers.

The above-discussed embodiments combine different technologies (mobility graphs (learning user behaviors), real-time vehicle and user position tracking, sensors, predictive parking, probability computation, multimodal routing, vehicle usage extrapolation, etc.) to provide a platform for mobility providers to share their data and get insights of candidate vehicles via combining many types of data sets, thereby determining candidate vehicle reservations and develop multi and intermodal transport solutions.

The processes described herein for proactive booking of a shared vehicle may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
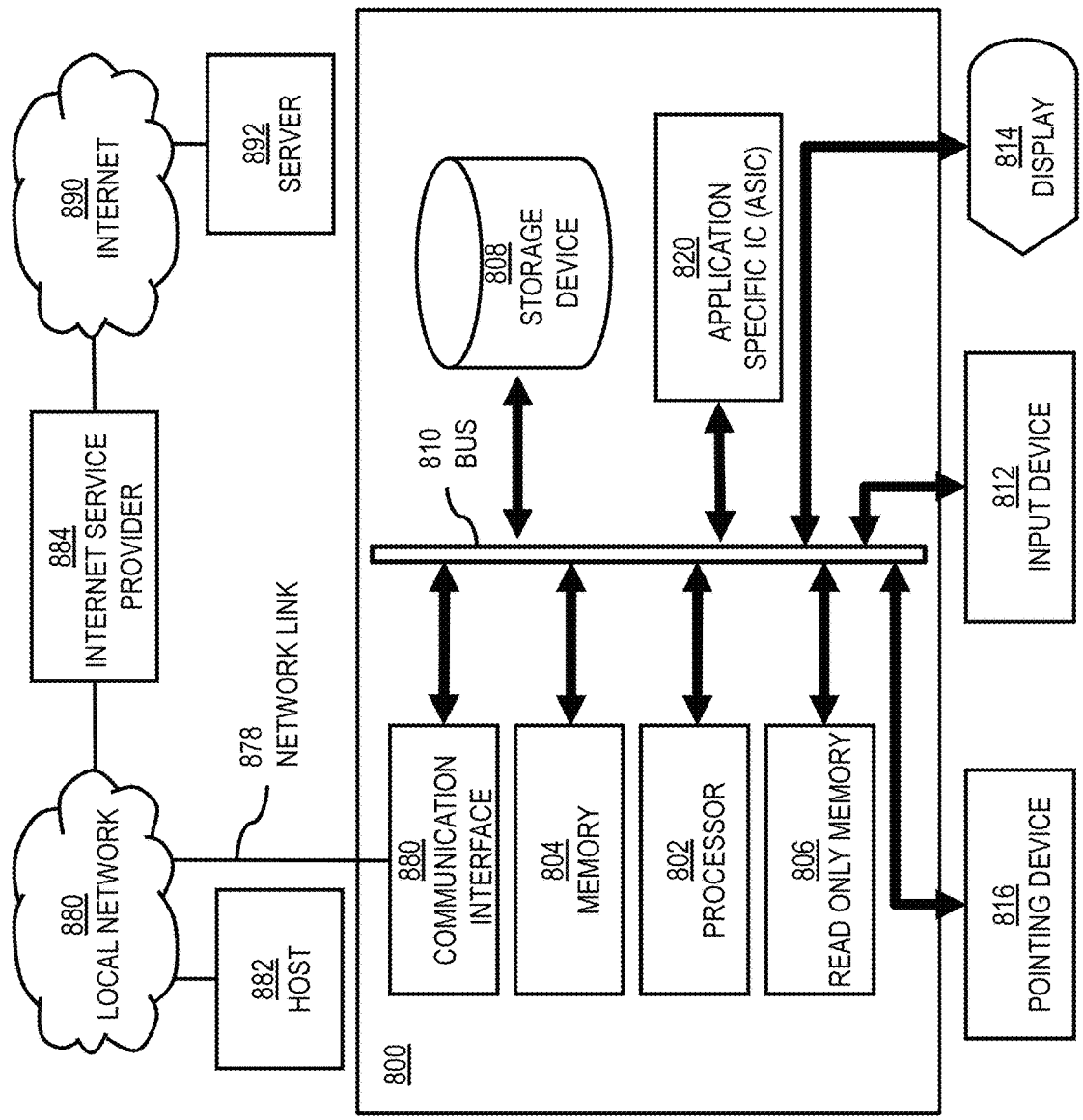
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide shared vehicle availability detection based on vehicle trajectory information as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of proactive booking of a shared vehicle.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to proactively book a shared vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RANI) or any other dynamic storage device, stores information including processor instructions for proactive booking of a shared vehicle. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for proactive booking of a shared vehicle, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for proactive booking of a shared vehicle to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of proactive booking of a shared vehicle.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 905 also stores the data associated with or generated by the execution of the inventive steps.

Figure 10:
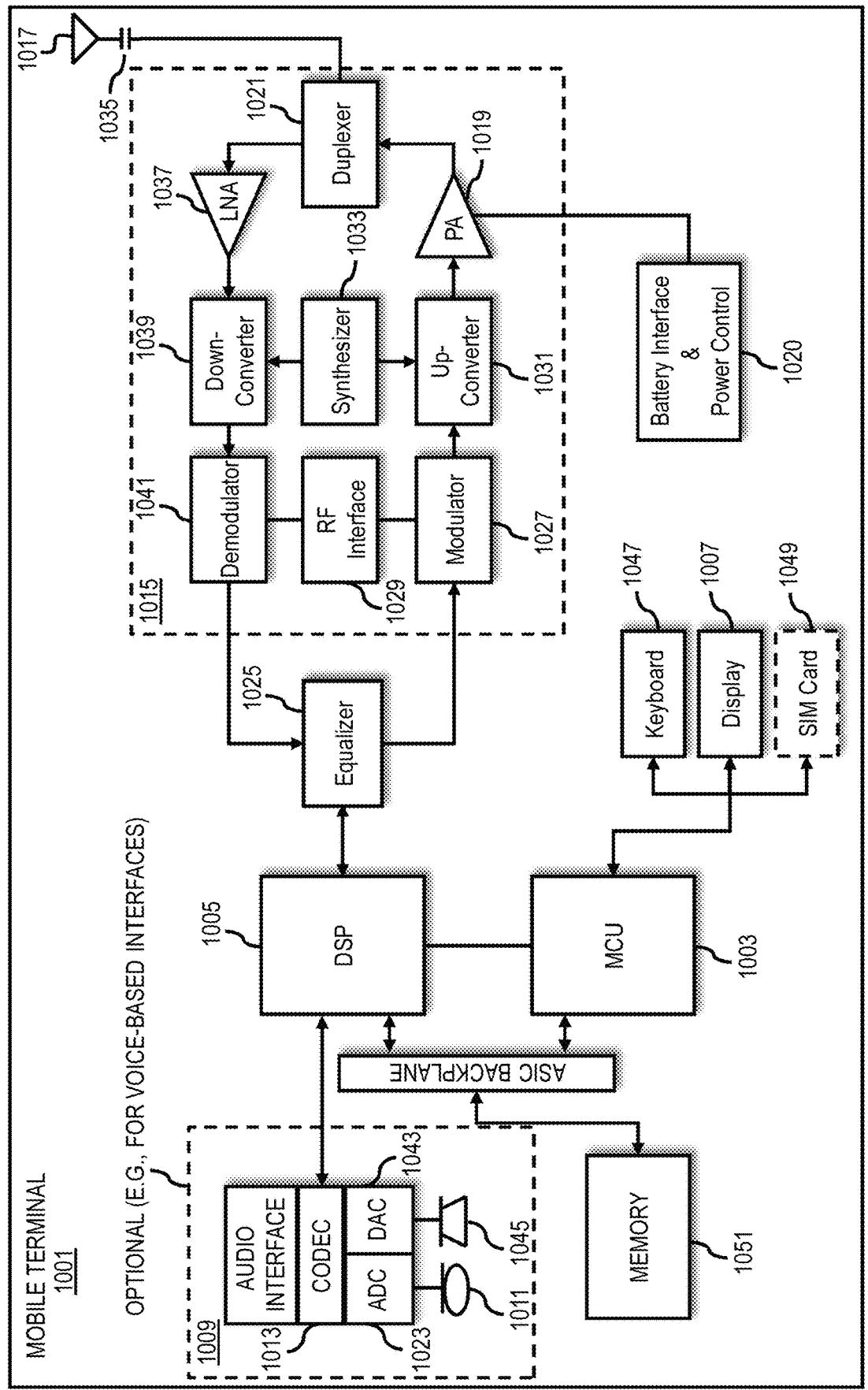
FIG. 10 is a diagram of a mobile terminal (e.g., mobile computer) that can be used to implement an embodiment of the invention.

FIG. 10 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of proactive booking of a shared vehicle. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of proactive booking of a shared vehicle. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support proactive booking of a shared vehicle is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared vehicle availability detection based on vehicle trajectory information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for proactive booking of a shared vehicle comprising:
   monitoring a location of a user with a routing platform to determine that the user is leaving for a destination, wherein the routing platform and a mobile terminal device of the user are operatively connected over a communication network to determine the location of the user;
   calculating a probability that the user will use a transport mode employing at least one of a plurality of shared vehicles for a route segment to the destination based on the monitored location of the user, a context, and a profile of the user;
   displaying, as a map overlay in a user interface of the mobile terminal device of the user, each of the plurality of shared vehicles relative to the location of the user based on real-time transport data, and the probability of each of the plurality of shared vehicles, wherein the probability is displayed in the user interface as a probability value;
   initiating a creation of a proactive reservation of the shared vehicle based on determining that the probability meets or exceeds a threshold value; and
   presenting the proactive reservation as an option to select or ignore the proactive reservation in the user interface, wherein the proactive reservation is created without intervention of the user.

2. The method of claim 1, further comprising:
   determining a type of the shared vehicle to reserve in the proactive reservation based on the context and the profile of the user.

3. The method of claim 1, further comprising:
   initiating a cancellation of the proactive reservation based on determining that the user has passed a location of the shared vehicle by a threshold distance or that the user has taken a different route segment.

4. The method of claim 3, further comprising:
   determining another shared vehicle that can be employed for the different route segment; and
   initiating a creation of another proactive reservation for the another shared vehicle based on the context and the profile of the user that has been updated for the different route.

5. The method of claim 1, further comprising:
   presenting a notification of an availability of the shared vehicle for use by the user based on determining that the user is within a threshold vicinity of a location of the shared vehicle.

6. The method of claim 5, wherein the notification is presented in a two-dimensional user interface, a three-dimensional user interface, an augmented reality user interface, or a combination thereof.

7. The method of claim 1, wherein the destination is determined from a next appointment queried from the user's calendar data.

8. The method of claim 1, further comprising:
   determining that the user has reached the destination using the shared vehicle of the proactive reservation;
   calculating another probability that the user will use the shared vehicle on a return journey based on the context and the profile of the user; and
   initiating an extension of the proactive reservation based on determining that the another probability meets or exceeds the threshold value,
   wherein the proactive reservation is extended without intervention of the user.

9. The method of claim 1, wherein the context includes weather, one or more people traveling with the user, a subsequent destination, a load carried by the user, or a combination thereof.

10. The method of claim 1, wherein the profile of the user includes user preferences regarding a number of transport modes, a vehicle type, model, cost, convenience, ease of use, or a combination thereof, vehicle usage history data regarding a number of transport modes, a vehicle type, model, cost, convenience, ease of use, or a combination thereof.

11. An apparatus comprising:
    at least one processor; and
    at least one memory including computer program code for one or more programs,
    the at least one memory and the computer program code configured to, with the at least one processor, cause the apparatus to perform at least the following,
       monitoring a location of a user with a routing platform to determine that the user is leaving for a destination, wherein the routing platform and a mobile terminal device of the user are operatively connected over a communication network to determine the location of the user;
       calculate a probability that the user will use a transport mode employing the shared vehicle for a route segment to the destination based on the monitored location of the user, a context and, a profile of the user;
       displaying, as a map overlay in a user interface of the mobile terminal device of the user, each of the plurality of shared vehicles relative to the location of the user based on real-time transport data, and the probability of each of the plurality of shared vehicles, wherein the probability is displayed in the user interface as a probability value;
       initiate a creation of a proactive reservation of the shared vehicle based on determining that the probability meets or exceeds a threshold value; and
       presenting the proactive reservation as an option to select or ignore the proactive reservation in the user interface,
       wherein the proactive reservation is created without intervention of the user.

12. An apparatus of claim 11, wherein the apparatus is further caused to:
    determine a type of the shared vehicle to reserve in the proactive reservation based on the context and the profile of the user.

13. An apparatus of claim 11, wherein the apparatus is further caused to:
    initiate a cancellation of the proactive reservation based on determining that the user has passed a location of the shared vehicle by a threshold distance or that the user has taken a different route segment.

14. An apparatus of claim 13, wherein the apparatus is further caused to:
    determine another shared vehicle that can be employed for the different route segment; and
    initiate a creation of another proactive reservation for the another shared vehicle based on the context and the profile of the user that has been updated for the different route.

15. An apparatus of claim 11, wherein the apparatus is further caused to:

present a notification of an availability of the shared vehicle for use by the user based on determining that the user is within a threshold vicinity of a location of the shared vehicle.

16. A non-transitory computer-readable storage medium carrying one or more sequences of one or more instructions which, when executed by one or more processors, cause an apparatus to at least perform the following steps:

monitoring a location of a user with a routing platform to determine that the user is leaving for a destination, wherein the routing platform and a mobile terminal device of the user are operatively connected over a communication network to determine the location of the user;

calculating a probability that the user will use a transport mode employing the shared vehicle for a route segment to the destination based on the monitored location of the user, a context, and a profile of the user;

displaying, as a map overlay in a user interface of the mobile terminal device of the user, each of the plurality of shared vehicles relative to the location of the user based on real-time transport data, and the probability of each of the plurality of shared vehicles, wherein the probability is displayed in the user interface as a probability value;

initiating a creation of a proactive reservation of the shared vehicle based on determining that the probability meets or exceeds a threshold value; and presenting the proactive reservation as an option to select or ignore the proactive reservation in the user interface, wherein the proactive reservation is created without intervention of the user.

17. A non-transitory computer-readable storage medium of claim 16, wherein the apparatus is further caused to perform:

determining a type of the shared vehicle to reserve in the proactive reservation based on the context and the profile of the user.

\* \* \* \* \*